US008506665B2

(12) United States Patent
Lankinen

(10) Patent No.: US 8,506,665 B2
(45) Date of Patent: Aug. 13, 2013

(54) CENTRIFUGAL SEPARATOR ASSEMBLY

(75) Inventor: Pentti Lankinen, Varkaus (FI)

(73) Assignee: Foster Wheeler Energia Oy, Espoo (FI)

( * ) Notice: Subject to any disclaimer, the term of this patent is extended or adjusted under 35 U.S.C. 154(b) by 769 days.

(21) Appl. No.: 12/678,317

(22) PCT Filed: Oct. 8, 2008

(86) PCT No.: PCT/FI2008/050557
§ 371 (c)(1),
(2), (4) Date: May 6, 2010

(87) PCT Pub. No.: WO2009/047386
PCT Pub. Date: Apr. 16, 2009

(65) Prior Publication Data

US 2010/0216621 A1 Aug. 26, 2010

(30) Foreign Application Priority Data

Oct. 8, 2007 (FI) .................................... 20075711

(51) Int. Cl.
*B01D 45/12* (2006.01)

(52) U.S. Cl.
USPC ............................... 55/459.1; 55/428; 55/430

(58) Field of Classification Search
USPC ........................................ 55/459.1, 428, 430
See application file for complete search history.

(56) References Cited

U.S. PATENT DOCUMENTS 6,793,013 B2 9/2004 Gounder
6,802,890 B2 10/2004 Hyppanen
6,938,780 B2 * 9/2005 Baglione et al. .............. 209/717
7,520,249 B2 4/2009 Morin et al.
2003/0150325 A1 8/2003 Hyppanen
2004/0065273 A1 * 4/2004 Baglione et al. .............. 122/4 D
2004/0134644 A1 7/2004 Gounder
2007/0079773 A1 4/2007 Morin et al.

FOREIGN PATENT DOCUMENTS

DE 0154 673 4/1982
DE 31 10840 A1 9/1982
DE 84 28 233.9 12/1987
EP 1 441 859 B1 6/2005
SU 1465125 A1 3/1989
WO WO 2004/063626 A1 7/2004

OTHER PUBLICATIONS

International Search Report mailed Jan. 28, 2009, in corresponding International Application No. PCT/FI2008/050557.

(Continued)

*Primary Examiner* — Jason M Greene
*Assistant Examiner* — Dung H Bui
(74) *Attorney, Agent, or Firm* — Fitzpatrick, Cella, Harper & Scinto

(57) ABSTRACT

A centrifugal separator assembly including a polygonal separator chamber formed of planar wall sections joined with each other to provide a substantially gas tight structure and having at least four pairs of planar opposite wall sections. The chamber includes a tapered portion formed by having a first inward bending in each of the wall sections. The tapered portion extends as a discharge channel for separated particles from the separator chamber, which discharge channel is formed of first and second pairs of opposite wall sections being perpendicular to each other. In the discharge channel for separated particles, the first pair of wall sections extends into the area between the second pair of wall sections.

20 Claims, 4 Drawing Sheets

(56) References Cited

OTHER PUBLICATIONS

Written Opinion mailed Jan. 28, 2009, in corresponding International Application No. PCT/FI2008/050557.
Notification and International Preliminary Report on Patentability issued Apr. 13, 2010, in corresponding International Application No. PCT/FI2008/050557.
Finnish Official Action dated Jul. 9, 2008, issued in corresponding Finnish application No. 20075711.
Russian Decision on Grant mailed Jun. 6, 2011, issued in counterpart Russian patent application No. 2010118502/05(026264), with an English translation.

* cited by examiner

CENTRIFUGAL SEPARATOR ASSEMBLY

This application is a U.S. national stage application of PCT International Application No. PCT/FI2008/050557, filed Oct. 8, 2008, published as PCT Publication No. WO 2009/047386 A1, on Apr. 16, 2009, and which claims priority from Finnish patent application number FI-20075711, filed Oct. 8, 2007.

TECHNICAL FIELD

The invention relates to centrifugal separators for separating solid particles from the process and product gases of fluidized bed reactors, especially, circulating fluidized bed reactors used for combustion or gasification of fuel material.

The invention particularly relates to a centrifugal separator assembly, comprising a polygonal separator chamber formed of planar wall sections joined with each other to provide a substantially gas tight structure and having at least four pairs of planar opposite wall sections, the chamber including a tapered portion formed by having a first inward bend in each of the wall sections, the tapered portion extending as a discharge channel for separated particles form the separator chamber, which discharge channel is formed by means of first and second pairs of opposite wall sections being perpendicular to each other.

BACKGROUND ART

It is known to manufacture cylindrical cyclones of a fluidized bed reactor as a cooled structure formed of parallel water tubes and having a conical bottom. To provide a water tube wall construction of a cylindrical form and to connect it to the surrounding construction requires a lot of manual labor, which could be minimized by using substantially planar walls.

U.S. Patent Application Publication No. 2007/0079773 discloses a rectangular cyclone in connection with a fluidized bed reactor made of tube walls. The construction of the conical part of the cyclone is such that each of the wall sections has a decreasing width, i.e., a triangular shape, and the edges thereof have been joined to the adjacent edges of the other wall section.

Published International Application No. WO 2004/063626 shows a heat exchange chamber having an enclosure with a tapered portion of a vertical polygonal heat exchange chamber having more than four sides with simple water tube panels in such a way that the various tapered portions may simultaneously taper inwardly in more than one horizontal direction, and that the widths of all water tube panels remain substantially uniform in the tapered portions. In applications where the chamber is a cyclone separator of a fluidized bed reactor, the outlet for separated solids remains considerably wide in cross-sectional area. It has also been noticed that the form of the tapered portion may be improved.

An object of the invention is to provide a centrifugal separator assembly, which has a tapered portion and a channel for the discharge of separated particles from the separator, and which thus requires less space and is better adapted to the requirements for handling the solid material in a fluidized bed reactor and its accessories.

DISCLOSURE OF THE INVENTION

According to a preferred embodiment of the invention, a centrifugal separator assembly comprises a polygonal separator chamber formed of planar wall sections joined with each other to provide a substantially gas tight structure and having at least four pairs of planar opposite wall sections, the chamber including a tapered portion formed by having a first, inward bend in each of the wall sections, the tapered portion extending as a discharge channel for separated particles from the separator chamber, which discharge channel is formed by means of first and second pairs of opposite wall sections being substantially perpendicular to each other. It is a characteristic feature of the invention that in the discharge channel for separated particles, the first pair of wall sections extends into the area between the second pair of wall sections.

Thus, the distance between the first pair of opposite wall sections is less than the width of the second pair of opposite wall sections in the area of the discharge channel. Preferably, the first pair of wall sections extends in a tapering direction into the area between the second pair of wall sections.

This makes is possible to have a considerably small cross-sectional area of the discharge channel, making the handling of separated particles straightforward.

Preferably, a gas seal arrangement and means for introducing fluidization gas are provided in connection with a lower section of the first pair of opposite wall sections. In this way, the space between the discharge for the separated particles and the gas seal in the return duct is considerably small and, thus, the amount of the accumulated solids is also small. This construction brings the benefit of having a smaller load caused by the weight of the particles to the structure.

The first pair of opposite wall sections and the second pair of opposite wall sections include a first bending and a second bending for forming the tapering portion. According to a preferred embodiment of the invention, the distance between the first and the second bendings in the first pair of wall sections is longer than the distance between the first and the second bendings in the second pair of wall sections.

Preferably, each wall section has a constant width over the length of the separator chamber. This brings the benefit that all tubes in the wall section may extend through the whole length of the wall section, i.e., there is no need for tube takeout, as if the wall section were made tapering.

According to an embodiment of the invention, the first pair of wall sections is provided with symmetrical bendings. This way, the vertical space required for the tapering portion of the separator is minimized.

The wall sections preferably comprise substantially evenly spaced tubes for arranging heat transfer medium flow through the wall sections when in use.

It is advantageous that all of the wall sections are of equal width. This way, the construction is easier, and it contributes to modularized manufacturing.

With the present invention, it is possible to construct the cyclone separator of planar walls of substantially constant width, and to have substantially all tubes of the wall structure extending through the whole length.

BRIEF DESCRIPTION OF THE DRAWINGS

In the following, the invention will be described with reference to the accompanying schematic drawings, in which.

DETAILED DESCRIPTION OF THE DRAWINGS

Figure 1:
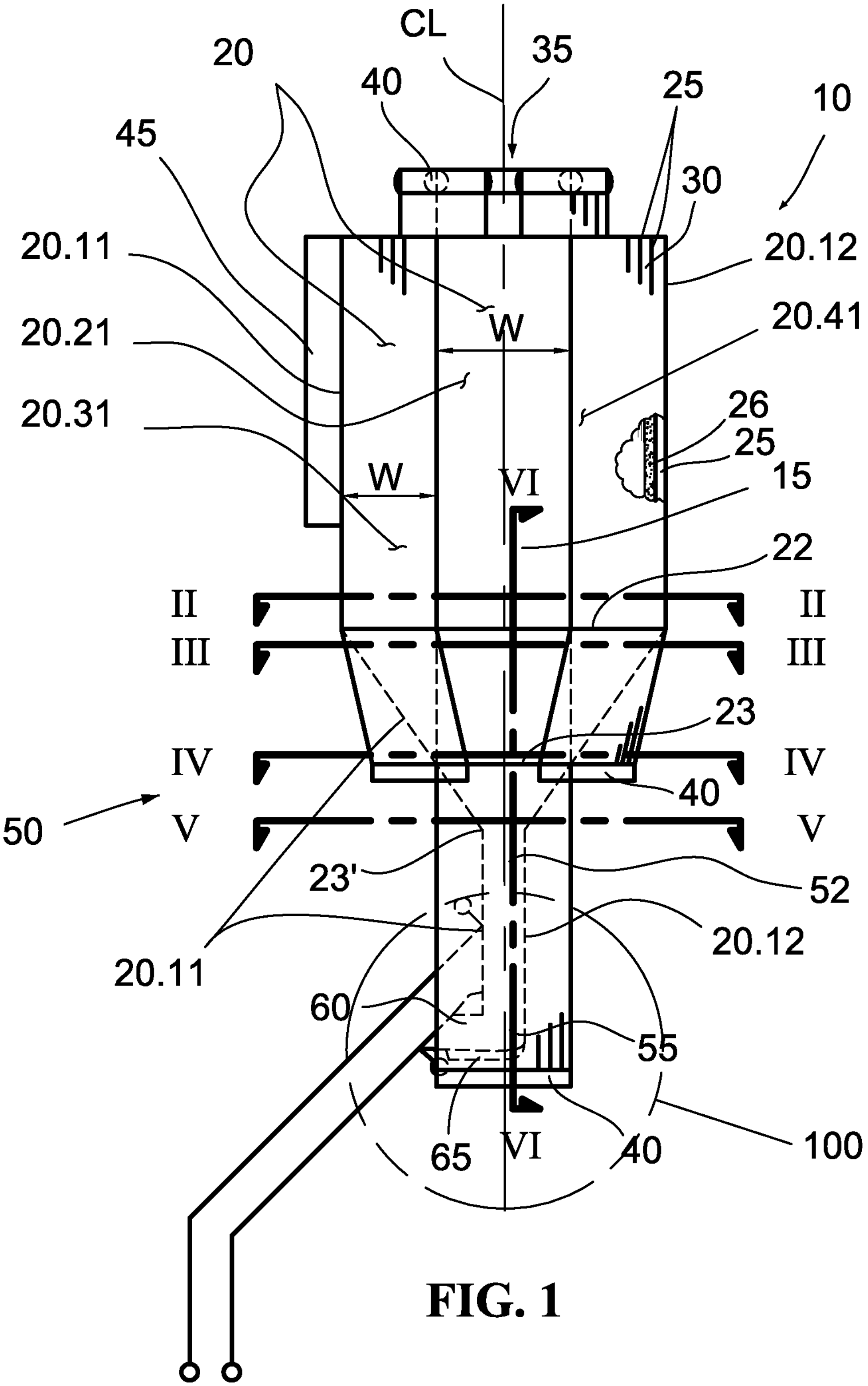
FIG. 1 illustrates a centrifugal separator assembly according to an embodiment of the present invention.
Figure 2:
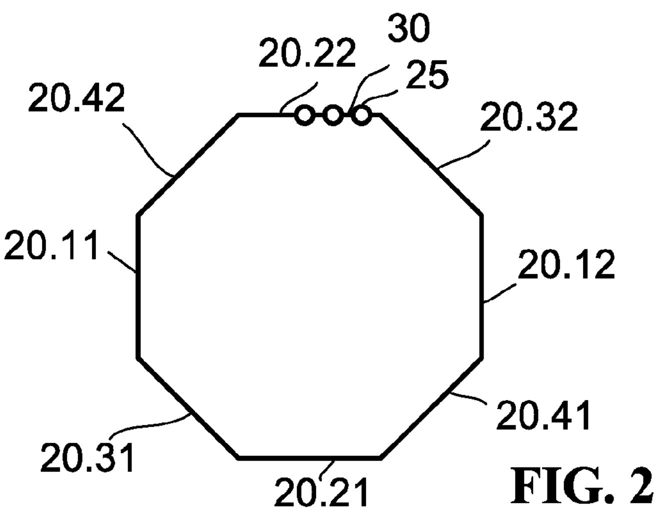
FIG. 2 illustrates a horizontal cross section II-II of FIG. 1.

FIGS. 1-6 illustrate a centrifugal separator assembly 10 according to an embodiment of the invention. The separator assembly 10 comprises a separator chamber 15 enclosed by planar wall sections 20. The cross section of the separator chamber 15 is octagonal, comprising four pairs of opposite wall sections 20.11, 20.12; 20.21, 20.22; 20.31, 20.32, 20.41, 20.42. The wall sections are manufactured, e.g., by joining adjacent tubes 25 with each other and are spaced by a fin 30 in a manner known per se to form a gas tight construction. Preferably, each wall section has a constant width W over the length of the separator chamber 15. This way, the wall sections may be easily prefabricated in a similar manner.

Each wall section is provided with manifolds 40 at its ends, to which the tubes are connected. There may be common manifolds provided for several wall sections, but preferably, each wall section is provided with individual manifolds (inlet and outlet). The wall sections are connected to the medium circulation of the power plant (not shown) in a manner designed case by case. Such a medium circulation is typically a steam cycle of the plant.

At the first end of the separator, which is the upper end, the adjacent wall sections 20 are bent inwardly towards the center axis, so that a gas outlet opening 35 is provided having a cross-sectional area smaller than the cross-sectional area of the separator chamber 15. The inner surface of the wall sections is preferably lined with suitable heat and abrasion resistant lining 26, so that the cross section of the gas space is made substantially circular, or at least the corners formed when connecting the adjacent wall sections to each other are evened, to make the inner surface substantially smooth.

The separator is provided with a gas inlet 45, through which hot gas and particles entrained therewith may be introduced into the gas chamber 15 of the cyclone when in use.

The centrifugal separator chamber assembly also includes a tapered portion 50 at its second end formed by inwardly bent portions of the wall sections 20. The tapered portion provides a transition from the octagonal cross section of the separator chamber 50 to a rectangular shape of the discharge channel for separated particles. Before the first bending 22, that is, in the region of the wall sections above the bending line, the cross-sectional area of the chamber is octagonal, as can be seen from FIG. 2, which illustrates the view II of FIG. 1. The wall section is illustrated for clarity reasons mainly by a solid line, but, in practice, the wall is typically manufactured of adjacent tubes 25 having a fin 30 between them.

Figure 3:
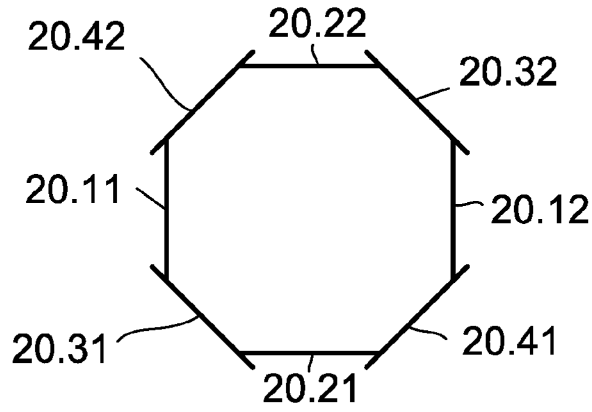
FIG. 3 illustrates a horizontal cross section of FIG. 1.

Each wall section 20 is provided with a first bending 22 at a same longitudinal (vertical) position, the bending lines being at the same level. First and second pairs of planar opposite wall sections 20.11, 20.12; 20.21, 20.22, between which, third and fourth pairs of planar opposite wall sections 20.31, 20.32; 20.41, 20.42 are located, are bent towards the center line CL of the separator chamber 15 at an angle greater than the angle in which the third and fourth pairs of planar opposite wall sections are bent. The third and fourth pairs of wall sections are bent against the edges of the first and second pairs of wall sections to cover the wedge shaped area between them. FIG. 3 shows the sectional view of FIG. 1, which illustrates that the first and the second pairs of planar opposite wall sections 20.11, 20.12; 20.21, 20.22 are closer to the central axis of the separator chamber.

Figure 4:
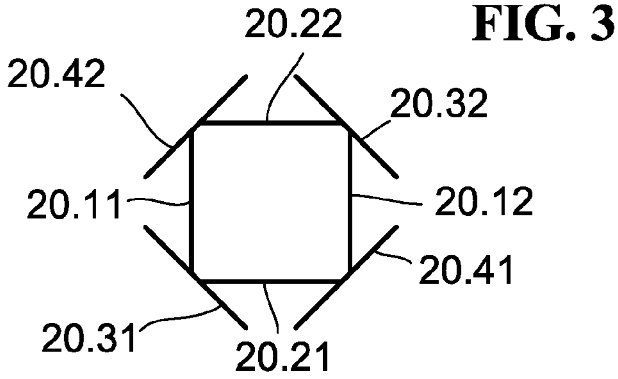
FIG. 4 illustrates a horizontal cross section IV-IV of FIG. 1.
Figure 5:
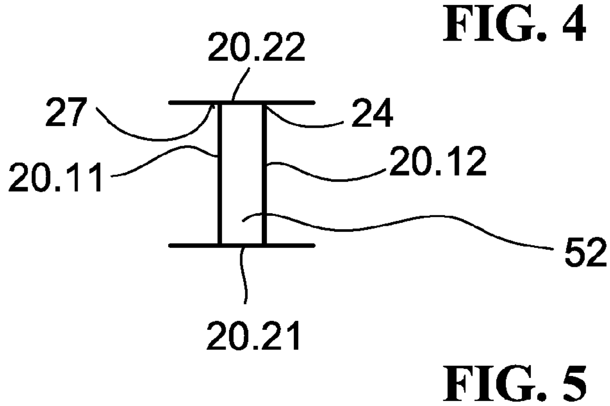
FIG. 5 illustrates a horizontal cross section V-V of FIG. 1.

At least the first and second pairs of planar opposite wall sections 20.11, 20.12; 20.21, 20.22 are provided with a second bending 23, 23', in which the wall sections are bent again outwardly away from the center line of the separator chamber. FIG. 4, showing the view of section IV-IV of FIG. 1, illustrates the situation just before the edges of the first and the second pairs of wall sections reach each other, and the second pair of wall sections 20.21, 20.22 will be provided with the second bending 23. Preferably, the wall sections before the first bending and after the second bending are on parallel planes. In other words, the areas outside the region between the bendings are on parallel planes. The distance between the first bending 22 and the second bending 23' of the first pair of wall sections 20.11, 20.12 is made longer than the distance between the first bending 22 and the second bending 23 of the second pair of wall sections 20.21, 20.22. Thus, the first pair of wall sections 20.11, 20.12 extends in a tapering direction into the area between the second pair of wall sections 20.21, 20.22. This is illustrated in FIG. 5. The first pair of wall sections 20.11, 20.12 extends between the second pair of walls sections 20.21, 20.22 forming a rectangular channel between them. The edges 24 of the first pair of wall sections are substantially gas tightly joined to the surface of the second pair of wall sections. In this manner, the cross-sectional area of the channel may be flexibly dimensioned for each application.

The first and the second pairs of planar wall sections form the discharge channel for separated particles as an extension of the tapered portion. The third and the fourth pairs of planar walls 20.31, 20.32; 20.41, 20.42 may have a second bending 23 at the same location as that of the second pair of wall sections, and extend further downwards, but that does not affect the inner form of the tapering portion of the separator chamber.

Figure 6:
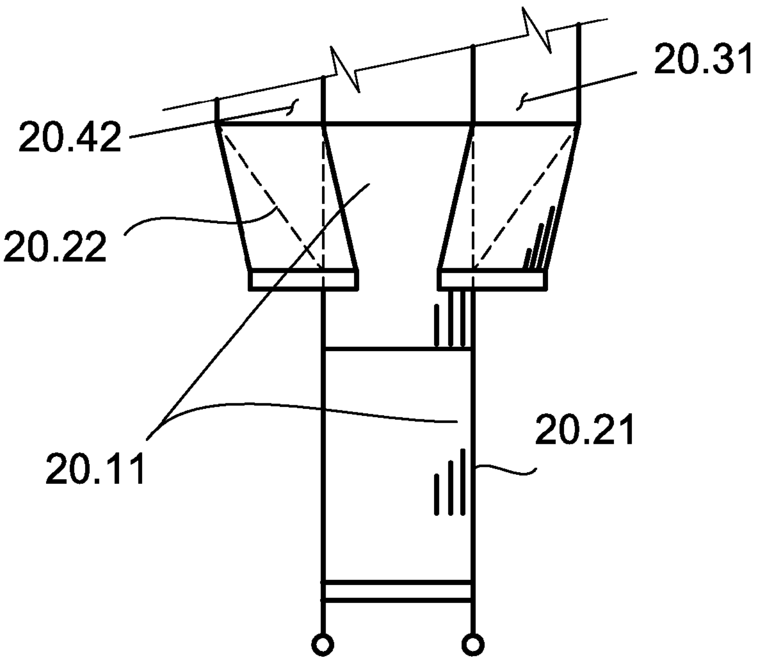
FIG. 6 illustrates a vertical cross section VI-VI of FIG. 1.
Figure 8:
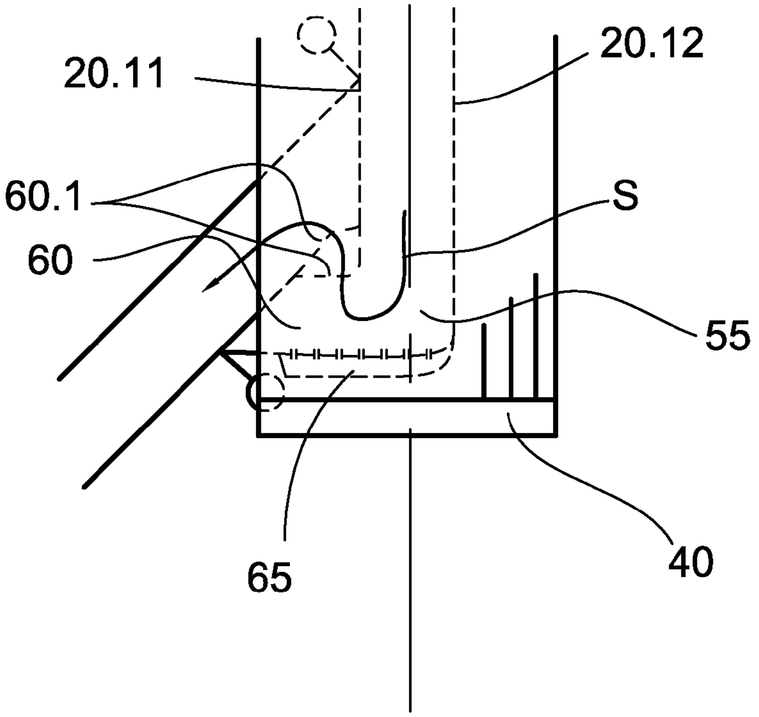
FIG. 8 illustrates the detail 100 shown in FIG. 1.

FIG. 1 and FIG. 6 (showing the view of section VI-VI of FIG. 1) illustrate that the first and second pairs of opposite wall sections extend further downwards from the second bending 23' of the first pair of opposite wall sections, thus forming a rectangular discharge channel 52. The first pair of wall sections 20.11, 20.12 is connected approximately at the end area thereof between the second pair of wall sections 20.21, 20.22 forming a bottom part 55. The bottom part 55 is provided with a gas seal 60 and means 65 for introducing fluidization gas into the end of the area of the channel comprising a wind box and gas nozzles. The detail 100 of the bottom part 55 is shown in more detail in FIG. 8. The gas seal is provided by arranging an open area to the wall section 21.11 by bending tubes 60.1 out of the general plane of the wall in a manner known per se. The flow of separated particles through the gas seal is illustrated by the arrow S in FIG. 8. The height of the rectangular channel between the bottom part 55 and the tapered portion is preferably limited to a height that is sufficient to provide the operation and existence of the gas seal, which, in practice, means a capability to fluidize the particles in the bottom part 55.

Figure 7:
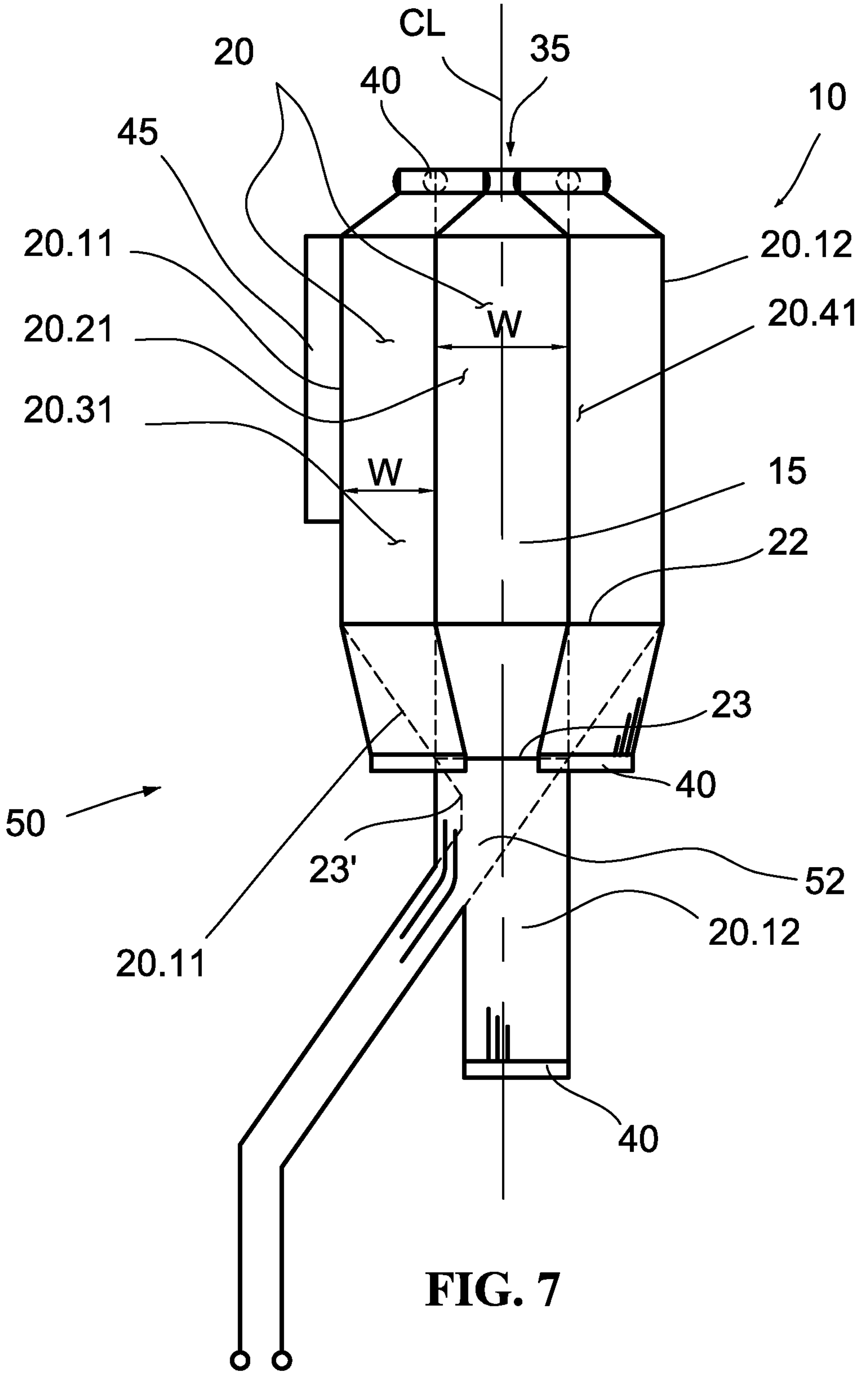
FIG. 7 illustrates a centrifugal separator assembly according to another embodiment of the invention.

It is also possible to provide a separator without a gas seal, as shown in FIG. 7. The centrifugal separator assembly 10 shown in FIG. 7 differs from that of FIG. 1 in the bendings of the first and second pairs of wall sections at their lower ends. The first pair of wall sections also forms two walls of a return duct extending, e.g., to the lower part of the fluidized bed reactor (not shown). Part of the second pair of wall sections 20.21, 20.22 forms two other walls of a return duct having the tubes bent to follow the return duct.

It is clear that the invention is not limited to the examples mentioned above, but can be implemented in many different embodiments within the scope of the inventive idea. It is also clear that the details mentioned in connection with one embodiment may be used in another embodiment when feasible.

The invention claimed is:

1. A centrifugal separator assembly, comprising:

a polygonal separator chamber formed of planar wall sections joined with each other to provide a substantially gas tight structure and having at least four pairs of planar opposite wall sections, the chamber including a tapered portion formed by having a first inward bending in each of the wall sections, the tapered portion extending as a discharge channel for separated particles from the separator chamber, which discharge channel is formed by first and second pairs of opposite wall sections being perpendicular to each other, wherein, in the discharge channel for separated particles, the first pair of wall sections extends into the area between the second pair of wall sections.

2. A centrifugal separator assembly according to claim 1, wherein all of the wall sections are of equal width.

3. A centrifugal separator assembly according to claim 1, wherein, in the discharge channel, the edges of the first pair of wall sections are substantially gas tightly joined to the surface of the second pair of wall sections.

4. A centrifugal separator assembly according to claim 1, wherein the first bending in each wall section is on the same plane.

5. A centrifugal separator assembly according to claim 1 wherein the first pair of opposite wall sections and the second pair of opposite wall sections include a second bending and the wall sections before the first bending and after the second bending are parallel.

6. A centrifugal separator assembly according to claim 1, wherein the wall sections comprise substantially evenly spaced tubes for allowing a heat transfer medium to flow through the wall sections when in use.

7. A centrifugal separator assembly according to claim 1, wherein the distance between the first pair of opposite wall sections in the area of the discharge channel is less than the width of the second pair of opposite wall sections.

8. A centrifugal separator assembly according to claim 7, wherein the first pair of opposite wall sections and the second pair of opposite wall sections include a second bending and the wall sections before the first bending and after the second bending are parallel.

9. A centrifugal separator assembly according to claim 7, wherein the wall sections comprise substantially evenly spaced tubes for allowing a heat transfer medium to flow through the wall sections when in use.

10. A centrifugal separator assembly according to claim 1, further comprising a gas seal arrangement and means for introducing fluidization gas provided in connection with a lower section of the first pair of opposite wall sections.

11. A centrifugal separator assembly according to claim 10, wherein the wall sections comprise substantially evenly spaced tubes for allowing a heat transfer medium to flow through the wall sections when in use.

12. A centrifugal separator assembly according to claim 1, wherein the first pair of opposite wall sections and the second pair of opposite wall sections include a second bending, and the distance between the first and the second bendings in the first pair of wall sections is longer than the distance between the first and second bendings in the second pair of wall sections.

13. A centrifugal separator assembly according to claim 12, wherein the wall sections comprise substantially evenly spaced tubes for allowing a heat transfer medium to flow through the wall sections when in use.

14. A centrifugal separator assembly according to claim 1, wherein each wall section has a constant width over the length of the separator chamber.

15. A centrifugal separator assembly according to claim 14, wherein the wall sections comprise substantially evenly spaced tubes for allowing a heat transfer medium to flow through the wall sections when in use.

16. A centrifugal separator assembly according to claim 1, wherein the first pair of wall sections extends in a tapering direction into the area between the second pair of wall sections.

17. A centrifugal separator assembly according to claim 16, wherein the wall sections comprise substantially evenly spaced tubes for allowing a heat transfer medium to flow through the wall sections when in use.

18. A centrifugal separator assembly according to claim 1, wherein the wall sections of the first pair of wall sections are provided with symmetrical first bendings.

19. A centrifugal separator assembly according to claim 18, wherein the wall sections comprise substantially evenly spaced tubes for allowing a heat transfer medium to flow through the wall sections when in use.

20. A circulating fluidized bed reactor for combusting or gasifying fuel material, the reactor comprising:

a centrifugal separator for separating solid particles from process and product gases produced by the combusting or gasifying the fuel material in the reactor, the centrifugal separator assembly comprising:

a polygonal separator chamber formed of planar wall sections joined with each other to provide a substantially gas tight structure and having at least four pairs of planar opposite wall sections, the chamber including a tapered portion formed by having a first inward bending in each of the wall sections, the tapered portion extending as a discharge channel for separated particles from the separator chamber, which discharge channel is formed by first and second pairs of opposite wall sections being perpendicular to each other, wherein, in the discharge channel for separated particles, the first pair of wall sections extends into the area between the second pair of wall sections.

* * * * *